(12) United States Patent
Yamazaki

(10) Patent No.: US 7,813,546 B2
(45) Date of Patent: Oct. 12, 2010

(54) IMAGE PROCESSING DEVICE, PROGRAM PRODUCT AND METHOD

(75) Inventor: Tsutomu Yamazaki, Odawara (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 758 days.

(21) Appl. No.: 09/942,173

(22) Filed: Aug. 30, 2001

(65) Prior Publication Data

US 2002/0044686 A1    Apr. 18, 2002

(30) Foreign Application Priority Data

Sep. 4, 2000    (JP)    ............... 2000-267304

(51) Int. Cl.
*G06K 9/00*    (2006.01)

(52) U.S. Cl. .................................. 382/167

(58) Field of Classification Search ............... 382/176, 382/167, 284; 345/636, 589, 593, 467, 471
See application file for complete search history.

(56) References Cited

U.S. PATENT DOCUMENTS

| 5,467,109 | A | * | 11/1995 | Nagaoka | ............ 345/589 |
| 5,585,822 | A | * | 12/1996 | Nishikawa | ............ 345/634 |
| 5,721,792 | A | * | 2/1998 | Thompson | ............ 382/274 |
| 5,872,573 | A | * | 2/1999 | Adegeest | ............ 345/621 |
| 5,930,385 | A | * | 7/1999 | Fujimoto et al. | ............ 382/162 |
| 6,701,010 | B1 | | 3/2004 | Katsuyama | |
| 6,809,741 | B1 | * | 10/2004 | Bates et al. | ............ 345/597 |

FOREIGN PATENT DOCUMENTS

| JP | 01025285 A | * 1/1989 |
| JP | 07-256972 | 10/1995 |
| JP | 09-062238 | 3/1997 |
| JP | 10-293835 | 11/1998 |
| JP | 11-288465 | 10/1999 |
| JP | 11-327789 | 11/1999 |
| JP | 2000-180977 | 6/2000 |

OTHER PUBLICATIONS

Notification of Reason for Refusal in JP 2000-267304 dated Jan. 13, 2009, and an English Translation thereof.
Notification of Reason for Refusal in JP 2000-267304 dated Mar. 31, 2009, and an English Translation thereof.

* cited by examiner

*Primary Examiner*—Brian Q Le
(74) *Attorney, Agent, or Firm*—Buchanan Ingersoll & Rooney PC

(57) ABSTRACT

An image processing device having an image processing unit 10 that adjusts colors of the foreground image data that are approximately equal to a uniform color that makes the boundary between the foreground image data and the background image data recognizable to all the colors of the background image data that serves as the foreground image data's background, and synthesizes the foreground image data and the background image data.

37 Claims, 6 Drawing Sheets

| FOREGROUND IMAGE COLOR | BACKGROUND IMAGE COLOR | AVERAGE BACKGROUND COLOR | ADJUSTING COLOR |
|---|---|---|---|
| R1,G1,B1 | RB11,GB11,BB11 | RA1,GA1,BA1 | R1c,G1c,B1c |
|  | RB12,GB12,BB12 |  |  |
|  | ⋮ |  |  |
|  | RB1m,GB1m,BB1m |  |  |
| R2,G2,B2 | RB21,GB21,BB21 | RA2,GA2,BA2 | R2c,G2c,B2c |
|  | RB22,GB22,BB22 |  |  |
|  | ⋮ |  |  |
|  | RB2m,GB2m,BB2m |  |  |
| ⋮ | ⋮ |  | ⋮ |
| Rn,Gn,Bn | RBn1,GBn1,BBn1 | RAn,GAn,BAn | Rnc,Gnc,Bnc |
|  | RBn2,GBn2,BBn2 |  |  |
|  | ⋮ |  |  |
|  | RBnm,GBnm,BBnm |  |  |

IMAGE PROCESSING DEVICE, PROGRAM PRODUCT AND METHOD

This application is based on Japanese Patent Application No. 2000-267304 filed on Sep. 4, 2000, the contents of which are hereby incorporated by reference.

BACKGROUND OF THE INVENTION

1. Field of the Invention

The present invention relates to an image processing device, its program product and method. In particular, the invention relates particularly to an image processing device, its program product and method for synthesizing foreground image data consisting of character or graphic images with background image data.

2. Description of the Related Art

The presentation materials that are printed on overhead projector sheets often contain foreground image data containing character images, etc., placed in front of background image data.

However, there are cases where the boundaries of the foreground image data and the background image data become unidentifiable depending on the colors of the background image data that exist in the areas surrounding the foreground image data such as character images, etc. and consequently, the character images, etc. stop being conspicuous completely.

As a means to solve such a problem, a technology has been known in which the colors of the foreground image data such as character images are changed depending on the colors of the background image data in order to make the foreground image data such as character images stand out among the background image data.

For example, Publication of Unexamined Japanese Patent Application, JP-A-10-293835 discloses a technology of adjusting colors of character images as character images appear differently depending on background image data when character images and their background image data are synthesized. Publication of Unexamined Japanese Patent Application, JP-A-7-256972 discloses a technology, for a case when character images are synthesized with another images and the density difference between the both images is within a certain preset value, of changing the density of at least one of the both images in the areas where the both images overlap each other.

However, in those technologies mentioned above, since the color adjustment is done independently to each area or pixel of character images, there can be a case where character images, which appear as the same color on the original document, are adjusted to different colors depending on the colors of the background image data.

Therefore, it has been a problem that, when character images obtained by reading an original document on which characters are color-coded depending on the function of each character, such as a part of title, subtitle, and keyword, are synthesized with the background image data, color-adjusted character images after synthesization lose the color-coding information completely.

SUMMARY OF THE INVENTION

It is an object of the present invention to provide an improved image processing device, program product and method for solving various problems mentioned above.

It is a further object of the present invention to provide an image processing device, program product and method for securely identifying character images, etc., embedded in background image data without damaging color-coding information such as a title expressed in a uniform color on the foreground image data, in synthesizing foreground image data such as character images and background image data.

According to an aspect of the invention, it is an image processing device comprising: a first color detection means for detecting colors of a first image data by each processing unit; a second color detection means for detecting colors of a second image data that serves as the first image data's background by each processing unit; and a color adjusting means for specifying a uniform adjusting color that makes the first image data recognizable against all colors of the second image data that serves as the first image data's background, concerning the first image data that have approximately equal colors.

According to another aspect of the invention, it is a program product for image processing that causes a computer to execute a process comprising the steps of: detecting colors of a first image data by each processing unit; detecting colors of a second image data that serves as the first image data's background by each processing unit; and specifying a uniform adjusting color that makes the first image data recognizable against all colors of the second image data that serves as the first image data's background, concerning the first image data that have approximately equal colors.

According to still another aspect of the invention, it is an image processing method comprising the steps of: detecting colors of a first image data by each processing unit; detecting colors of a second image data that serves as the first image data's background by each processing unit; and specifying a uniform adjusting color that makes the first image data recognizable against all colors of the second image data that serves as the first image data's background, concerning the first image data that have approximately equal colors.

The objects, features, and characteristics of this invention other than those set forth above will become apparent from the description given herein below with reference to preferred embodiments illustrated in the accompanying drawings.

DETAILED DESCRIPTION OF THE PREFERRED EMBODIMENT

The embodiments of this invention will be described below with reference to the accompanying drawings.

Figure 1:
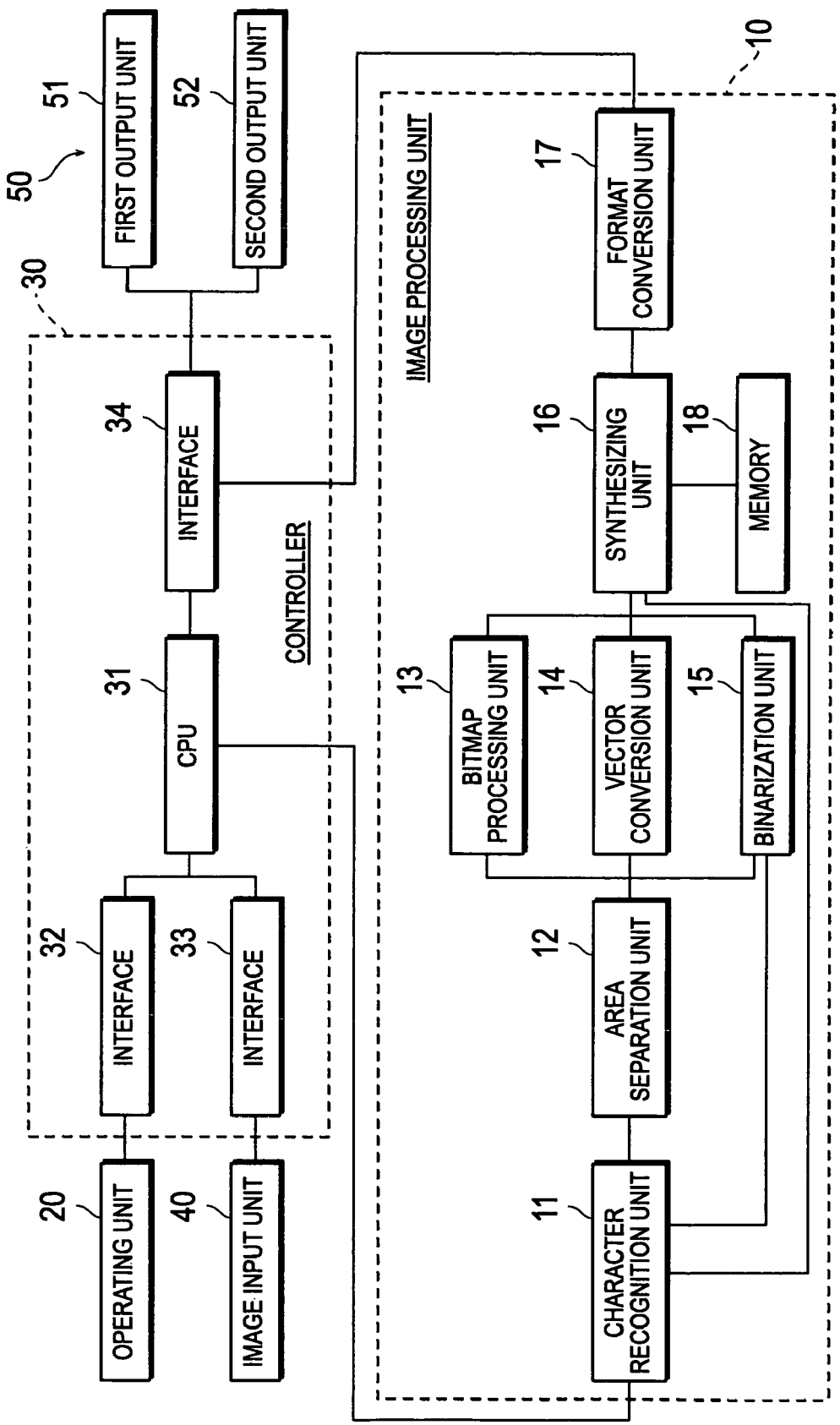
FIG. 1 is a block diagram showing the general constitution of an image processing device according to an embodiment of the invention.

FIG. 1 is a block diagram showing the general constitution of an image processing device according to an embodiment of the invention.

The image processing device has an image processing unit 10, an operating unit 20, a controller 30, an image input unit 40, and an image output unit 50.

The image processing unit 10 has a character recognition unit 11, an area separation unit 12, a bitmap processing unit 13, a vector conversion unit 14, a binarization unit 15, a synthesizing unit 16, a format conversion unit 17, and a memory 18, and is capable of applying a specified process to inputted foreground image data and synthesizing the foreground image data and the background image data.

Although it is not shown in the drawing, the operating unit 20 has a touch screen display and input keys and is used by the user for entering instruction information. The instruction information includes specifically the scanning start instruction for starting scanning of the document by the image input unit 40 and instructions for manual setup items.

The manual setup items include a setup for readout mode, a setup for post-processing, a setup for image synthesizing mode, and a setup for output format.

The readout mode includes the color mode for processing a document image as a color image and the monochromatic mode for processing a document image as a monochromatic image at the image input unit 40.

The setup for post-processing is a mode for selecting various post-processes to be applied to the areas that are separated by the area separation unit 12 and the character recognition unit 11 of the image processing unit 10, i.e., character areas, graphics areas, and photographic areas. The post-processes include character coding at the character recognition unit 11, bitmap processing at the bit map processing unit 13, vector conversion process at the vector conversion unit 14, and binarization process at the binarization unit 15.

The image synthesizing mode includes an "image synthesizing-no mode," in which the inputted image data are not synthesized at the image processing unit 10, an "image synthesizing-yes mode," in which the inputted image data are synthesized, in other words, recognized as foreground image data, and a "background input mode," in which the inputted image data are recognized as background image data.

The output format is a format for output files that are prepared at the format conversion unit 17 of the image processing unit 10. The setup of this output format is selected from the general purpose file formats such as a document file format, a page description language format, a file format for document display, and a file format for storing images.

The controller 30 has an interface 32 for the control unit 20, an interface 33 for the image input unit 40, an interface 34 for the image output unit 50, and a CPU 31 for controlling the entire image processing device.

This controller 30 receives instruction information from the operating unit 20 through the interface 32. The information of the manual setup items thus received are inputted into the image processing unit 10. When the controller 30 receives the scanning start instruction from the operating unit 20, it transmits the starting instruction to the image input unit 40 for the scanning operation either in the color mode or in the monochromatic mode depending on the readout mode.

The image input unit 40 consists of an image readout device such as a scanner. When it receives the start instruction for the scanning operation from the controller 30, the image input unit 40 reads (scans) the document in the specified readout mode (color/monochromatic mode). The image data obtained by reading the document is transmitted to the image processing unit 10 via the interface 33.

The image output unit 50 has a first output unit 51 and a second output unit 52, and receives the image data transmitted from the image processing unit 10 via the interface 34. The first output unit 51 consists of an image forming device such as a color printer, and prints the image data on a recording medium such as a sheet of paper. The second output unit 52 consists of, for example, a computer equipped with a monitor, and the transmitted image data are displayed, stored or data processed.

Figure 2:
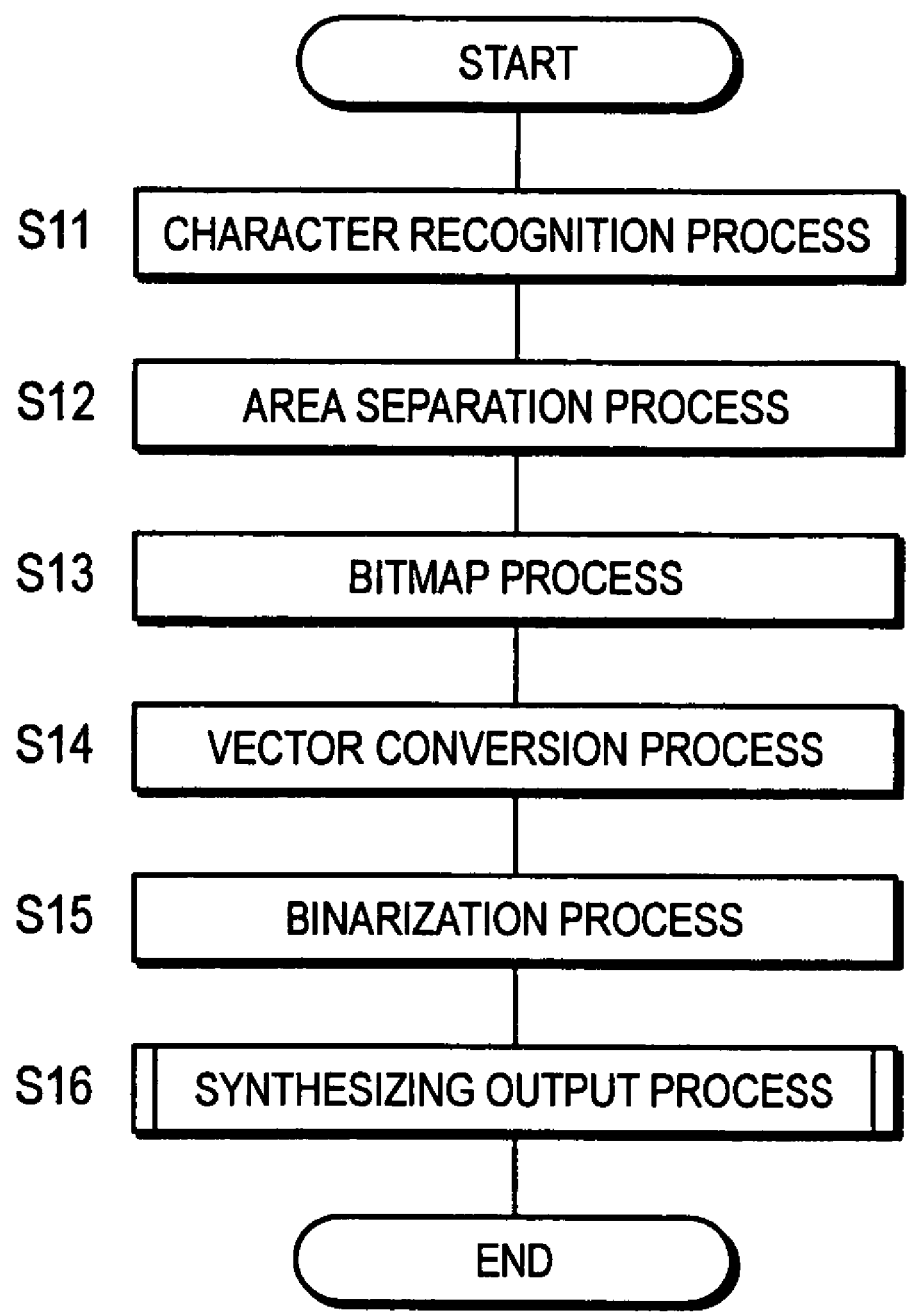
FIG. 2 is a flow chart showing the image processing of an image processing unit.
Figure 3:
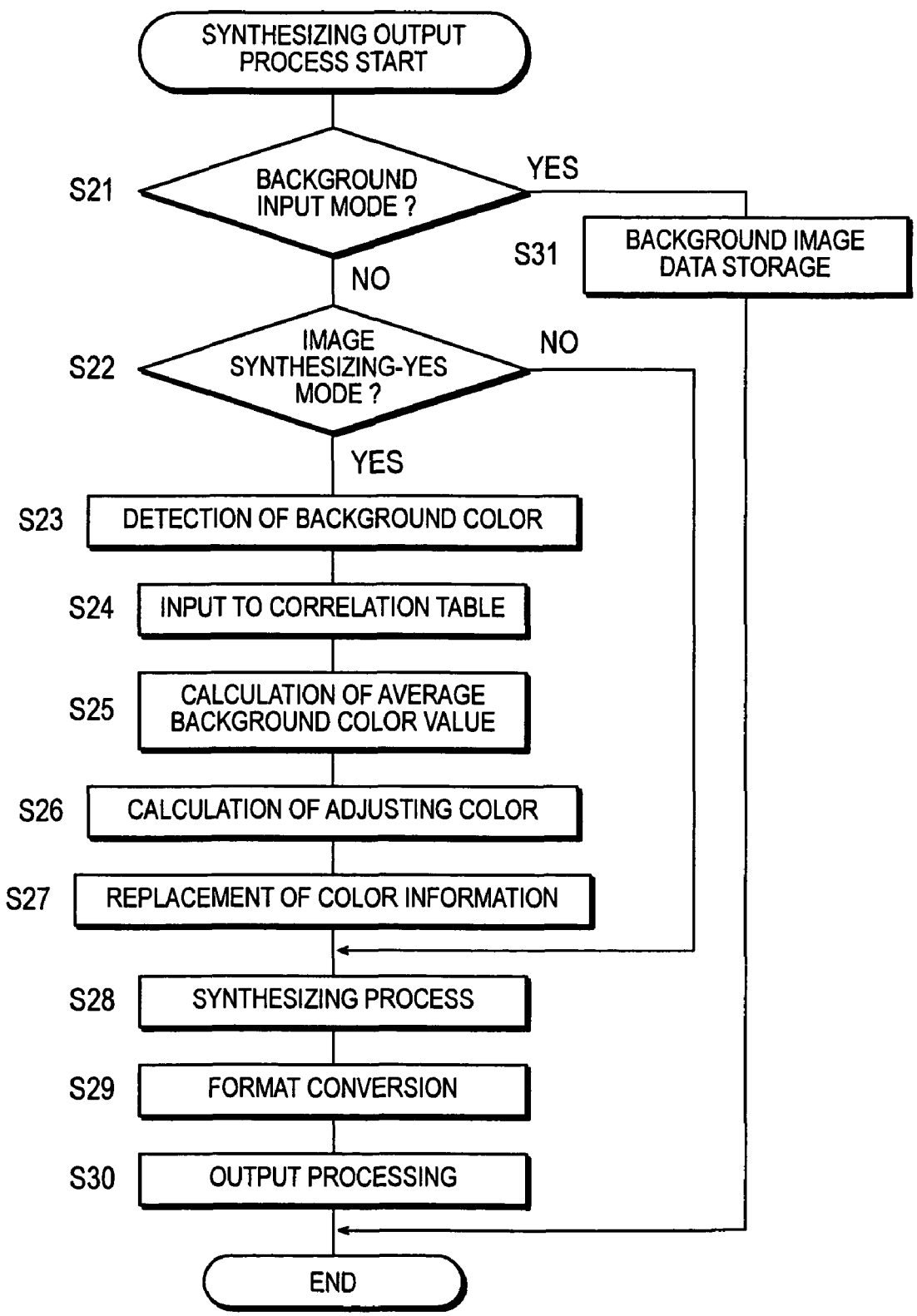
FIG. 3 is a flow chart showing the procedure of a synthesizing process.

Next, the operation of the image processing unit 10 will be described using the flow charts shown in FIG. 2 and FIG. 3.

First, at the step S11, character recognition processing will be performed for the image data inputted into the image processing unit 10.

If the background input mode is not set up here, the character recognition unit 11 extracts character areas where the character images exist from the inputted image data. The image data, from which the character areas have been removed, are inputted into the area separation unit 12.

The character recognition unit 11 recognizes character codes from character images and converts them into character code data. The character recognition unit 11 detects character information such as position information, character counts and color information from character images. The position information includes the x-y coordinates, width information, and length (height) dimensions of the character images. The character recognition unit 11 outputs the character code data to the synthesizing unit 16 together with the character information containing the position information and the color information. If the binarization process is set up as the post-process by the user, the character area will be inputted into the binarization unit 15.

If the background input mode is set up here, the character recognition unit 11 transmits all the areas of the inputted image data to the area separation unit 12 identifying them as non-character areas.

At the step S12, the area separation process will be conducted to the image data, from which character images have been removed.

If the background input mode is not set up here, the area separation unit 12 separates the image data, from which character images have been removed, into graphic areas and photographic areas. Photographic images in the photographic areas will be added with position information and transmitted to the bitmap processing unit 13, while graphic images in the graphic image areas will be added with position information and will be transmitted to the vector conversion unit 14.

On the other hand, if the background input mode is set up here, the area separation unit 12 identifies all the areas of the inputted image data as photographic areas and transmits photographic images in the photographic areas to the bitmap processing unit 13.

At the step S13, the bitmap processing unit 13 applies edge compensation and smoothing to the inputted photographic images in the photographic areas. After that, the data in the photographic area are inputted into the synthesizing unit 16 with the position information.

At the step S14, the vector conversion unit 14 vector-converts the inputted graphic images in the graphic areas to generate vector data. The vector conversion unit 14 detects attributive information including color information such as the color of the enclosed areas surrounded by the vector data, line widths, line types, line colors and endpoint shapes. The vector data are inputted into the synthesizing unit 16 together with the attributive information. The vector conversion means converting graphics consisting of mesh points into vector data such as straight lines, arcs, and Bezier curves.

At the step S15, the binarization unit 15 binarizes image data inputted from the character recognition unit 11 and/or area separation unit 12 if the binarization process is set up as the post-process. More specifically, as an example, if the character images in the character areas are not be converted into the character code data, the binarization unit 15 binarizes the input image data according to the specified threshold value. The binarized character image data thus obtained will be added with the position information and color information and inputted into the synthesizing unit 16.

At the step S16, the synthesizing process will be conducted, in which the data from the character recognition unit 11, the bit map processing unit 13, the vector conversion unit 14, and the binarization unit 15 are synthesized and outputted.

Next, the synthesizing output process at the step S16 will be described in detail using the flow chart of FIG. 3.

At the step S21, it is judged whether the background input mode is set up or not. In case it is the background input mode (S21: Yes), the process of the step S31 is executed, while, in case it is not the background input mode (S21: No), the process of the step S22 is executed.

Figure 4:
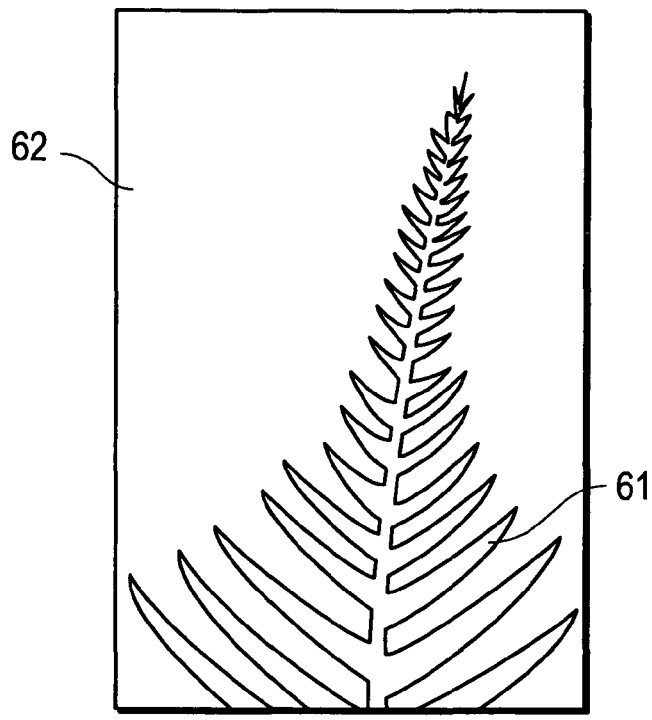
FIG. 4 is an example of background image data.

At the step S31, the synthesizing unit 16 stores all the data inputted into the synthesizing unit 16, i.e., the background image data, into the memory 18 to complete the operation of the image processing unit 10. More specifically, for example, the background image data shown in FIG. 4 is stored in the memory 18.

On the other hand, at the step S22 it is judged whether the image synthesizing-yes mode is set up. In case it is the image synthesizing-yes mode (S22: Yes), the process of the step S23 is executed, while, in case it is the image synthesizing-no mode (S22: No), the process of the step S28 is executed.

At the step S23, the synthesizing unit 16 extracts the position information of circumscribing rectangles of all elements of the foreground image data and detects the colors of the background image data that correspond to those circumscribing rectangles, i.e., the background colors. More specifically, for example, it extracts the position information of a circumscribing rectangle for each individual character image, etc., in the foreground image data shown in FIG. 5, plugs said circumscribing rectangle 66 into the background image data shown in FIG. 6, and detects the background color within said circumscribing rectangle. The background color is an average color of the colors of pixels in said circumscribing rectangle. The foreground image data are made up of character code data from the character recognition unit 11, vector data from the vector conversion unit 14, and binarized character image data from the binarization unit 15.

Figures 6, 7:
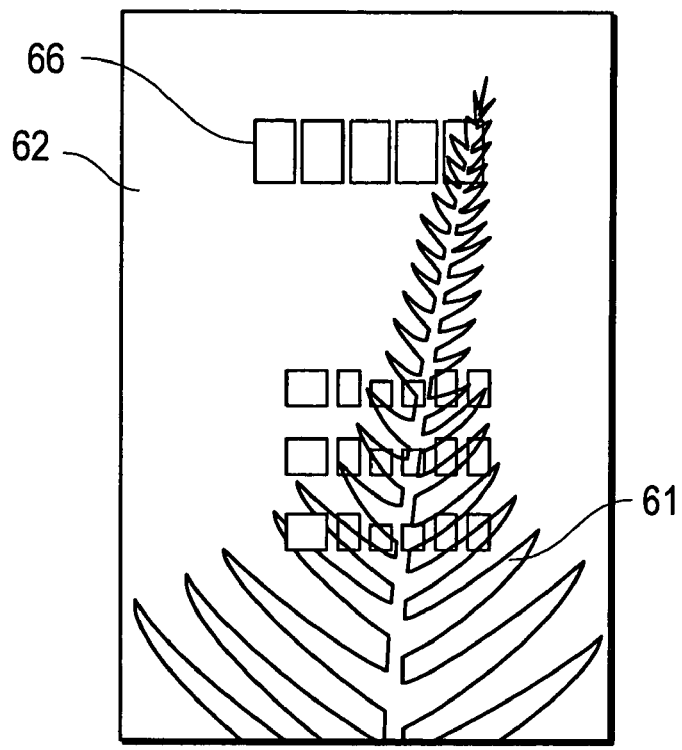
FIG. 6 is a diagram describing how background colors are detected.
FIG. 7 is a diagram showing a correlation table.

At the step S24, the synthesizing unit 16 enters the colors of the foreground image data, i.e., the foreground colors, and the background colors, into the correlation table shown in FIG. 7. This correlation table is stored in the memory 18.

The foreground colors are expressed, for example, by the RGB color system as (Rn, Gn, Bn) (n=1, 2, . . . ) and are stored into the foreground color column of the correlation table. The background colors are expressed, for example, by the RGB color system as (RBnm, GBnm, BBnm) (n, m=1, 2, . . . ), which are correlated to the foreground color of the corresponding position and are stored into the background color column of the correlation table.

Let the two foreground colors that are compared be expressed in the RGB color system as (Ri, Gi, Bi) and (Rj, Gj, Bj). If the K value for those colors obtained from the following formula (1) is lower than a specified threshold value;

$$K=(Ri-Rj)^2+(Gi-Gj)^2+(Bi-Bj)^2 \quad (1)$$

then, the two colors are judged to be approximately equal and the two foreground colors will be grouped together for storage in the memory. In other words, if another foreground color, for which the K value according to the formula (1) is smaller than the specified threshold value, exists in the correlation table, the background color is added to the existing foreground color group. Moreover, the first foreground color, which entered the correlation table, becomes the color of the foreground color group. However, it is also possible to select the average of the colors in a foreground color group as the color of the foreground color group. On the other hand, if no other foreground color which makes the K value less than the specified threshold value exists in the correlation table, a new foreground color group will be added to the table, and background colors will be inputted into the table relating to be correlated to it.

At the step S25, the synthesizing unit 16 calculates the average value of all the background colors entered in correlation with each foreground color group. The calculated average background color is to be entered into the average background color column of the correlation table.

The average background color is obtained for each coordinate as an average value of the background colors expressed by the coordinate value of the specified color system. More specifically, the average background color value can be calculated according to the following formula (2) as expressed, for example, in the RGB color system as (RAn, GAn, BAn):

$$RAn = \sum_{l=1}^{lmax} RBnl / lmax \quad (2)$$

$$GAn = \sum_{l=1}^{lmax} GBnl / lmax$$

$$BAn = \sum_{l=1}^{lmax} BBnl / lmax$$

where lmax is the number of background colors correlated to the foreground color group.

At the step S26, the synthesizing unit 16 calculates the color of the foreground image data after the adjustment, i.e., the adjusting color, based on the color of the foreground color group and the average background color calculated in correspondence to the color of the foreground color group. In other words, the synthesizing unit 16 calculates an adjusting color that makes the boundary between the foreground image data and the background image data recognizable for all colors of the background image data.

The foreground colors and the average background colors of the correlation table are now color converted from the RGB color system to the L*a*b* color system. The synthesizing unit 16 selects as the adjusting color a color that maintains the hue of a foreground color and is located furthest from the corresponding average background color in distance on the color space of the L*a*b* color system. More specifically, when the foreground color, the average background color, and the adjusting color of the foreground image data are expressed in the L*a*b* color system as (Ln, an, bn), (LAn, aAn, bAn), and (Lnc, anc, bnc), the synthesizing unit 16 calculates the (Lnc, anc, bnc) that maximizes the value J in the following formulas:

$$J=(Lnc-LAn)^2+(anc-aAn)^2+(bnc-bAn)^2$$

$$H=bn/an$$

The method of calculating the adjusting color is not limited to the above method. For example, the synthesizing unit 16 can calculate the adjusting color by setting:

$$anc=|an| \text{ when } aAn<0; anc=-|an| \text{ when } aAn \geq 0;$$

$bnc=|bn|$ when $bAn<0$; $bnc=-|bn|$ when $bAn \geqq 0$;

and maximizing Lnc.

The adjusting colors (Lnc, anc, bnc) calculated in the L*a*b* color system are then color converted into the RGB color system, and the adjusting colors (Rnc, Gnc, Bnc) expressed in the RGB color system are then entered in the adjusting color column of the correlation table.

The colors (R, G, B) in the RGB color system are color converted into the colors (X, Y, Z) in the XYZ color system by means of the following formula (3), and further into the colors (L*, a*, b*) in the L*a*b* color system according to the formula (4). The color conversion in the opposite direction can be done using inverse function of the formulas (3) and (4). The 3×3 matrix of formula (3) shown below is a proper value of a device such as a printer or a scanner, and is prepared as a data for describing the characteristics such as the correspondence of the colors for color matching.

$$\begin{bmatrix} X \\ Y \\ Z \end{bmatrix} = \begin{bmatrix} Rx & Gx & Bx \\ Ry & Gy & By \\ Rz & Gz & Bz \end{bmatrix} \begin{bmatrix} R \\ G \\ B \end{bmatrix} \quad (3)$$

$$L^* = 116(Y/Y_0)^{1/3} - 16$$

$$a^* = 500[(X/X_0)^{1/3} - (Y/Y_0)^{1/3}]$$

$$b^* = 200[(Y/Y_0)^{1/3} - (Z/Z_0)^{1/3}] \quad (4)$$

At the step S27, the synthesizing unit 16 replaces the color information (R, G, B) attached to the character code data, the vector data, and the binarized character image data as the foreground image data with the calculated adjusting color (Rnc, Gnc, Bnc) with reference to the correlation table.

At the step S28, the synthesizing unit 16 synthesizes the data from the character recognition unit 11, the bit map processing unit 13, the vector conversion unit 14, and the binarization unit 15. If the image synthesizing-yes mode is set up as the image synthesizing mode, the foreground image data and the background image data, i.e., its background, are synthesized. Both image data will be synthesized according to a predetermined internal format.

At the step S29, the format conversion unit 17 converts the image data synthesized according to the predetermined internal format into the output format specified by the user.

At the step S30, the format conversion unit 17 transmits the synthesized image data converted to the output format to the interface 34 connected to the image output unit 50.

Figure 5:
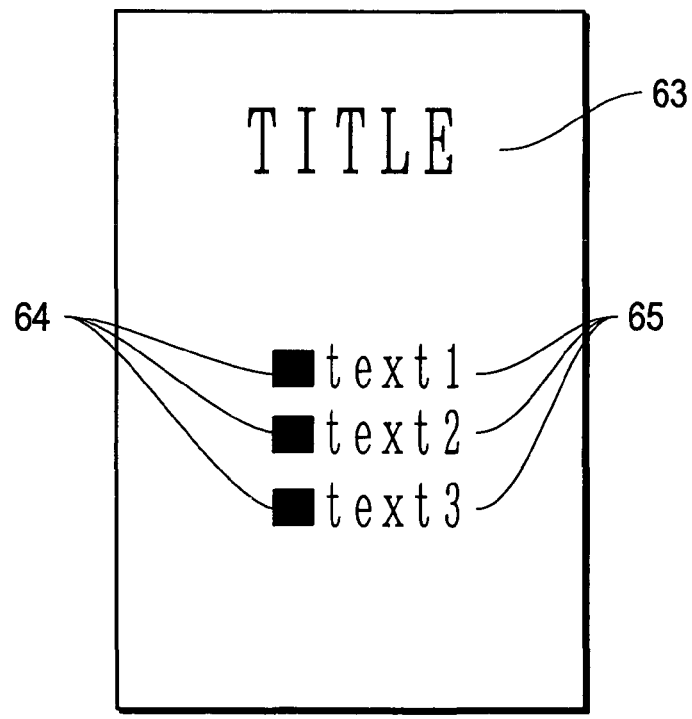
FIG. 5 is an example of foreground image data.
Figure 8:
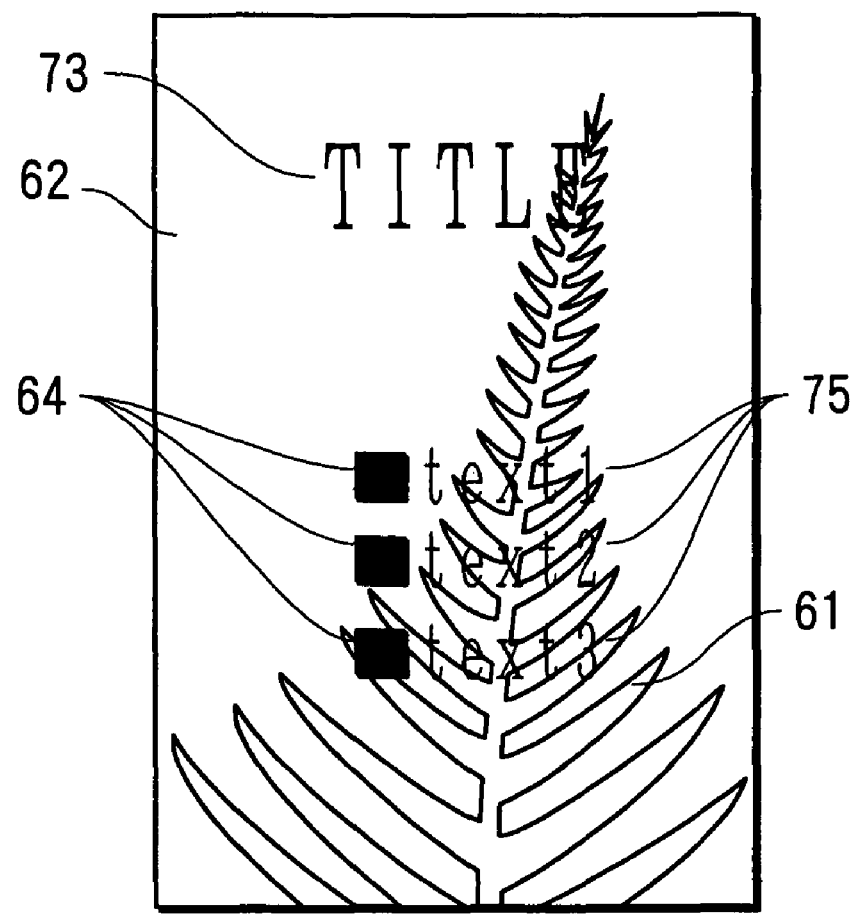
FIG. 8 is an example of synthesizing image data.

FIG. 8 is a diagram showing an example of a synthesized image data produced by synthesizing the background image data shown in FIG. 4 and the foreground image data shown in FIG. 5.

The background image data here consists of a green leaf section 61 and a brown background section 62 (see FIG. 4). The foreground image data consists of a black character section 63, a red symbol section 64, and a deep green character section 65 (see FIG. 5). In the synthesized image data where both image data are synthesized, the black character section 63 of the foreground image data is color-adjusted to a white character section 73, and the deep green character section 65 is color-adjusted to red character section 75.

Therefore, each section of the foreground image data becomes recognizable against both the green leaf section 61 and the brown background section 62 of the background image data, making them more legible. Moreover, although the character sections 63 and 65 of the foreground image data are both overlapping with both of different color sections 61 and 62 of the background image data, they are not adjusted to easily identifiable colors on the background image data, and the character sections, which appeared as approximately same colors on the foreground image data, are color-adjusted into a uniform color. Thus, the designer's original color-coded information, e.g., the information for the title, subtitle and keyword, will be maintained in the foreground image data.

As can be seen from the above, the specific colors in the foreground image data having approximately same colors are adjusted to a uniform color, which makes the boundaries between the foreground image data and the background image data recognizable to all the colors of the background image data that serves as the background. Therefore, color-coding information such as the title expressed in a uniform color on the foreground image data will not be lost from the synthesized image data obtained by synthesizing the foreground image data such as character images and its background, i.e., the background image data. Moreover, character images, etc., are easily legible against the background image data.

The invention is not limited to the above-mentioned embodiment, but rather can be changed in various ways with the scope of the claims of the patent.

For example, although it was described about a color copying system that functions as an image processing device equipped with the image input unit 40 consisting of a color scanner, etc., and the image output unit 50 having the first output unit 51 consisting of a color printer, etc., as well as the second output unit 52 consisting of a computer having a monitor, etc., the invention is not limited to it. For example, the invention can be applied to a digital color copying machine that has an image input unit and an image output unit built into the machine.

The invention also can be applied to a computer that functions as an image processing device. In this case, the image data can not only be prepared by the computer but also can be received from other information equipment such as a scanner or can be downloaded via a network.

Furthermore, it often happens with presentation materials that different foreground image data are drawn over the same background image data so that multiple sheets can be prepared quickly. In such a case, it is possible to transmit the background image data to the printer only once while transmitting as many foreground images as needed for synthesizing both images at the printer's controller.

Various means to constitute the image processing device and the image processing method according to this invention can be realized by a dedicated hardware circuit or a programmed computer. In realizing the invention by means of a programmed computer, the program for operating the computer can be provided by computer readable recording medium (e.g., flexible disk or CD-ROM). In this case, the program recorded on computer readable recording medium is normally transferred to the hard disk and stored. This program can be provided as independent application software or can be built into the software of the computer as a function of the computer. The program product in this invention includes the program itself as well as the computer readable recording medium on which the program is stored.

What is claimed is:

1. An image processing device comprising:
   a computing device having a processor, wherein the processor is programmed to function as:
      a first color detection means for detecting colors of first image data by each processing unit, said first image data including data of a plurality of foreground objects and grouping all of the detected colors of the plurality of foreground objects in the first image data into groups, each group containing a grouping of approximately equal colors from the plurality of foreground objects;

a second color detection means for detecting colors of second image data that serves as the first image data's background by each processing unit, the second image data having a plurality of different colors; and means for comparing, for each group, a representative color that is determined from the approximately equal colors of the group, to all the colors of the second image data that are adjacent to the first image data of the group and for specifying a single uniform adjusting color to be used for the group, that makes the first image data recognizable against all colors of the second image data that serve as the first image data's background;

wherein the computing device includes:

a first memory means for storing the colors of the first image data by each of the approximately equal colors; and a second memory means for storing the colors of the second image data that serves as the first image data's background, said colors of which are correlated to each of the corresponding colors of the first image data that are stored in said first memory means; wherein said comparing and specifying means includes:

an average color value calculating means for calculating an average value of all the colors of the second image data and for each group an average value of all the colors in each group as the representative color, the average value of all the colors of the second image data being correlated to each of the representative colors of the first image data; and an adjusting color calculating means for calculating said adjusting color for each of the colors of the first image data based on each of the representative colors of the first image data and the average color value of the second image data calculated in correspondence with each of the representative colors of the first image data.

2. An image processing device as claimed in claim 1, wherein the processor is programmed to function as:

an image synthesizing means for synthesizing the first image data converted into said adjusting color with said second image data.

3. An image processing device as claimed in claim 2, wherein the processor is programmed to function as:

a file preparing unit for preparing an electronic file based on the image data synthesized by said image synthesizing means.

4. An image processing device as claimed in claim 2, further comprising:

a printer unit for printing images on recording media based on the image data synthesized by said image synthesizing means.

5. An image processing device as claimed in claim 1, wherein said processing unit is a pixel.

6. An image processing device as claimed in claim 1, wherein the processor is programmed to function as:

a judging means for judging that colors of the first image data are approximately equal when a sum of squares of the differences of their coordinate values in a specified color system is less than a specified value.

7. An image processing device as claimed in claim 1, wherein said average color value calculating means calculates the average value of the coordinate values of the colors of the second image data in a specified color system.

8. An image processing device as claimed in claim 7, wherein when a color of the first image data stored in said first memory means, an average color value of the second image data calculated in correspondence with the color of the first image data, and an adjusting color of the first image data are expressed in the L*a*b* color system as (Ln, an, bn), (LAn, aAn, bAn), and (Lnc, anc, bnc), as defined in the present specification;

said adjusting color calculating means calculates the (Lnc, anc, bnc) that maximizes the value J in the following formulas:

$$J=(Lnc-LAn)^2+(anc-aAn)^2+(bnc-bAn)^2$$

$$H=bn/an.$$

9. An image processing device as claimed in claim 7, wherein when a color of the first image data stored in said first memory means, an average color value of the second image data calculated in correspondence with the color of the first image data, and an adjusting color of the first image data are expressed in the L*a*b* color system as (Ln, an, bn), (LAn, aAn, bAn), and (Lnc, anc, bnc), as defined herein the present specification;

said adjusting color calculating means sets $$anc=|an|, \text{ when } aAn<0; anc=-|an|, \text{ when } aAn>0,$$

$$bnc=|bn|, \text{ when } bAn<0; bnc=-|bn|, \text{ when } bAn>0, \text{ and maximizes Lnc.}$$

10. An image processing device as claimed in claim 1, wherein said first image data is an image data that represents character images.

11. An image processing device as claimed in claim 1, wherein the computing device includes:

a third memory means for storing said second image data.

12. An image processing device as claimed in claim 1, further comprising:

a scanner unit for obtaining said first image data and/or said second image data by means of reading a document.

13. An image processing device as claimed in claim 1, wherein the grouping means individually compares each representative color to a value representing a combination of all of the colors of the second image data.

14. A computer-readable non-transitory storage device containing a program product for image processing that causes a computer to execute a process comprising the steps of:

detecting colors of first image data by each processing unit, said first image data including data of a plurality of foreground objects;

grouping all of the detected colors of the plurality of foreground objects in the first image data into groups, each group containing a grouping of approximately equal colors from the plurality of foreground objects;

detecting colors of second image data that serves as the first image data's background by each processing unit, the second image data having a plurality of colors;

comparing, for each group, a representative color that is determined from the approximately equal colors of the group, to all the colors of the second image data that are adjacent to the first image data of the group and specifying a single uniform adjusting color to be used for the group, that makes the first image data recognizable against all colors of the second image data that serve as the first image data's background;

storing the colors of the first image data by each of the approximately equal colors into a specified memory means; and storing the colors of the second image data that serves as the first image data's background, said colors of which are correlated to each of the corresponding colors of the first image data that are stored in said specified memory means; wherein said specifying a uniform adjusting color includes: calculating an average value of all the colors of the second image data and calculating an average value of all the colors in each group as the representative color, the average value of all the colors of the second image data being correlated to each of the representative colors of the first image data, and calculating said adjusting color for each of the representative colors of the first image data based on each of the colors of the first image data and the average color value of the second image data calculated in correspondence with each of the representative colors of the first image data.

15. A computer-readable non-transitory storage device containing a program product as claimed in claim 14, wherein said process further comprising the step of:

synthesizing the first image data converted into said adjusting color with said second image data.

16. A computer-readable non-transitory storage device containing program product as claimed in claim 15, wherein said process further comprises the step of:

preparing an electronic file based on the image data synthesized at said step of synthesizing.

17. A computer-readable non-transitory storage device containing a program product as claimed in claim 14, wherein said processing unit is a pixel.

18. A computer-readable non-transitory storage device containing a program product as claimed in claim 14, wherein said process further comprises the step of:

judging that colors of the first image data are approximately equal when a sum of squares of the differences of their coordinate values in a specified color system is less than a specified value.

19. A computer-readable non-transitory storage device containing a program product as claimed in claim 14, wherein said step of calculating average value is for calculating the average value of the coordinate values of the colors of the second image data in a specified color system.

20. A computer-readable non-transitory, storage device containing a program product as claimed in claim 19, wherein when a color of the first image data stored in said specified memory means, an average color value of the second image data calculated in correspondence with the color of the first image data, and an adjusting color of the first image data are expressed in the L*a*b* color system as (Ln, an, bn), (LAn, aAn, bAn), and (Lnc, anc, bnc), as defined in the present specification;

said step of specifying a uniform adjusting color is for calculating the (Lnc, anc, bnc) that maximizes the value J in the following formulas:

$$J=(Lnc-LAn)^2+(anc-aAn)^2+(bnc-bAn)^2$$

$$H=bn/an.$$

21. A computer-readable non-transitory storage device containing a program product as claimed in claim 19, wherein when a color of the first image data stored in said specified memory means, an average color value of the second image data calculated in correspondence with the color of the first image data, and an adjusting color of the first image data are expressed in the L*a*b* color system as (Ln, an, bn), (LAn, aAn, bAn), and (Lnc, anc, bnc), as defined in the present specification;

$anc=|an|$, when $aAn<0$; $anc=-|an|$, when $aAn>0$, $bnc=|bn|$, when $bAn<0$; $bnc=-|bn|$, when $bAn>0$, and maximizes Lnc.

22. A computer-readable non-transitory storage device containing a program product as claimed in claim 14, wherein said first image data is an image data that represents character images.

23. A computer-readable non-transitory storage device containing a program product as claimed in claim 14, wherein each representative color is individually compared to a value representing a combination of all of the colors of the second image data.

24. An image processing method performed by a computing device having a processor comprising the processor programmed to:

detect colors of first image data by each processing unit, said first image data including data of a plurality of foreground objects;

group all of the detected colors of the plurality of foreground objects in the first image data into groups, each group containing a grouping of approximately equal colors from the plurality of foreground objects;

detect colors of second image data that serves as the first image data's background by each processing unit, the second image data having a plurality of colors;

compare, for each group, a representative color that is determined from the approximately equal colors of the group, to all the colors of the second image data that are adjacent to the first image data of the group and specifying a single uniform adjusting color to be used for the group, that makes the first image data recognizable against all colors of the second image data that serve as the first image data's background;

store the colors of the first image data by each of the approximately equal colors into a specified memory means; and store the colors of the second image data that serves as the first image data's background, said colors of which are correlated to each of the corresponding colors of the first image data that are stored in said specified memory means; wherein said specifying a uniform adjusting color includes: calculating an average of all the colors of the second image data and calculating an average value of all the colors in each group as the representative color, the average value of all the colors of the second image data being correlated to each of the representative colors of the first image data, and calculating said adjusting color for each of the representative colors of the first image data based on each of the colors of the first image data and the average color value of the second image data calculated in correspondence with each of the representative colors of the first image data.

25. An image processing method as claimed in claim 24, wherein the processor is programmed to:

synthesize the first image data converted into said adjusting color with said second image data.

26. An image processing method as claimed in claim 24, wherein said processing unit is a pixel.

27. An image processing method as claimed in claim 24, wherein each representative color is individually compared to a value representing a combination of all of the colors of the second image data.

28. An image processing device comprising:
a computing device having a processor, wherein the processor is programmed to function as:
a first color detector for detecting colors of first image data by each unit of first image data, said first image data including data of a plurality of foreground objects and grouping all of the detected colors of the plurality of foreground objects in the first image data into groups, each group containing a grouping of approximately equal colors from the plurality of foreground objects;
a second color detector for detecting colors of second image data that serves as the first image data's background by each unit of second image data, the second image data having a plurality of colors; and
a color adjusting circuit for comparing, for each group, a representative color that is determined from the approximately equal colors of the group, to all the colors of the second image data that are adjacent to the first image data of the group and specifying a single uniform adjusting color to be used for the group, that makes the first image data recognizable against all colors of the second image data that serve as the first image data's background;
wherein the computing device includes:
a first memory for storing the colors of the first image data by each of the approximately equal colors; and
a second memory for storing the colors of the second image data that serves as the first image data's background, said colors of which are correlated to each of the corresponding colors of the first image data that are stored in said first memory; wherein
said color adjusting circuit includes an average color value calculating circuit for calculating an average value of all the colors of the second image data and an average value of all the colors of each group as the representative color, the average value of all the colors of the second image data being correlated to each of the representative colors of the first image data, and an adjusting color calculating circuit for calculating said adjusting color for each of the colors of the first image data based on each of the representative colors of the first image data and the average color value of the second image data calculated in correspondence with each of the representative colors of the first image data.

29. An image processing device as claimed in claim 28, wherein one processor is programmed to function as an image synthesizing circuit for synthesizing the first image data converted into said adjusting color with said second image data.

30. An image processing device as claimed in claim 28, wherein said units are pixels.

31. An image processing device as claimed in claim 28, wherein one processor is programmed to function as a judging circuit for judging that colors of the first image data are approximately equal when a sum of squares of the differences of their coordinate values in a specified color system is less than a specified value.

32. An image processing device as claimed in claim 28, wherein
said average color value calculating circuit calculates the average value of the coordinate values of the colors of the second image data in a specified color system.

33. An image processing device as claimed in claim 32, wherein when a color of the first image data stored in said first memory, an average color value of the second image data calculated in correspondence with the color of the first image data, and an adjusting color of the first image data are expressed in the L*a*b* color system as (Ln, an, bn), (LAn, aAn, bAn), and (Lnc, anc, bnc), as defined in the present specification;
said adjusting color calculating circuit calculates the (Lnc, anc, bnc) that maximizes the value J in the following formulas:

$$J=(Lnc-LAn)^2+(anc-aAn)^2+(bnc-bAn)^2$$

$$H=bn/an.$$

34. An image processing device as claimed in claim 32, wherein when a color of the first image data stored in said first memory, an average color value of the second image data calculated in correspondence with the color of the first image data, and an adjusting color of the first image data are expressed in the L*a*b* color system as (Ln, an, bn), (LAn, aAn, bAn), and (Lnc, anc, bnc), as defined in the present specification;
said adjusting color calculating circuit sets $$anc=|an|, \text{ when } aAn<0; anc=-|an|, \text{ when } aAn>0,$$

$$bnc=|bn|, \text{ when } bAn<0; bnc=-|bn|, \text{ when } bAn>0, \text{ and maximizes Lnc.}$$

35. An image processing device as claimed in claim 28, wherein said first image data is an image data that represents character images.

36. An image processing device as claimed in claim 28, wherein the computing device includes a third memory for storing said second image data.

37. An image processing device as claimed in claim 28, wherein the color adjusting circuit individually compares each representative color to a value representing a combination of all of the colors of the second image data.

* * * * *